Aug. 25, 1970  L. W. PETERS  3,525,269
HARVESTING MACHINE COMPONENT DRIVE
Filed Nov. 4, 1968  2 Sheets-Sheet 1
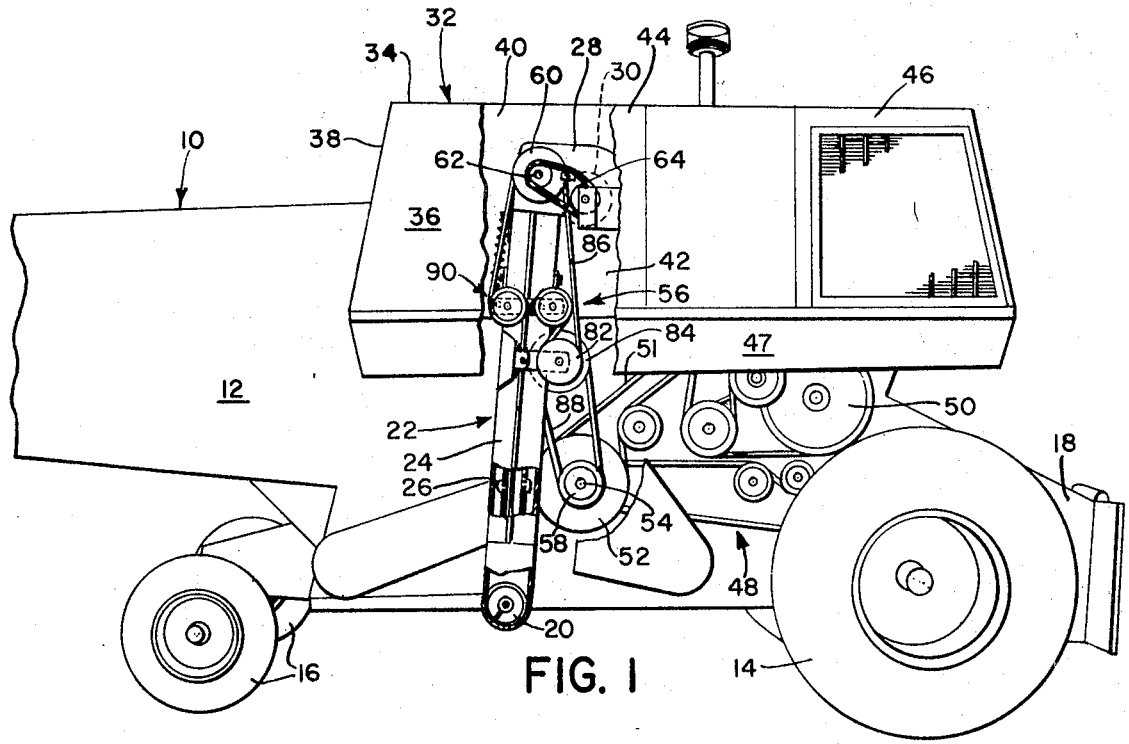
FIG. 1
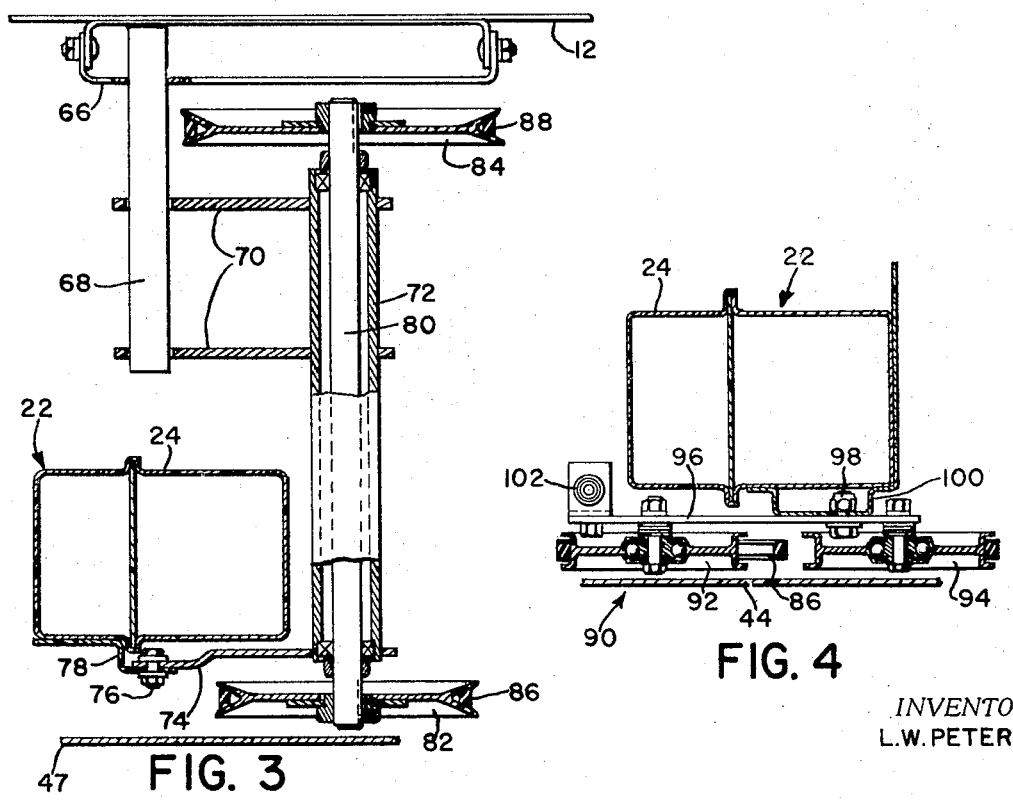
FIG. 3
FIG. 4
INVENTOR.
L.W. PETERS

INVENTOR.
L.W. PETERS

United States Patent Office 3,525,269
Patented Aug. 25, 1970

3,525,269
HARVESTING MACHINE COMPONENT DRIVE
Loren William Peters, Bettendorf, Iowa, assignor to Deere & Company, Moline, Ill., a corporation of Delaware
Filed Nov. 4, 1968, Ser. No. 773,007
Int. Cl. F16h 7/12
U.S. Cl. 74—227       7 Claims

ABSTRACT OF THE DISCLOSURE

A self-propelled combine has an elevated grain tank that laterally overhangs the main separator body and is loaded by a conveyor driven by a belt drive with an input sheave adjacent the combine body and an output sheave outwardly of the input sheave and adjacent the grain tank side wall. The belt drive includes one belt between the input sheave and an intermediate sheave and a second belt between the output sheave and another intermediate sheave spaced from the first intermediate sheave on a transversely shiftable shaft. A spring-loaded idler tensions one belt and the tension therein is transmitted to the other belt through the shiftable shaft.

BACKGROUND OF THE INVENTION

With the increasing size and capacity of modern combines, there has been a corresponding increase in the capacity of the combine grain tanks, so that the harvesting operation need not be interrupted at too frequent intervals for emptying the grain tank. There has also been a trend toward providing combines with lower profiles, the lower center of gravity improving the appearance and stability of the machines. The combination of larger grain tanks and lower profiles has necessitated grain tanks that cover a relatively large horizontal area, and in most modern combines, the grain tanks laterally overhang both sides of the main separator body.

Conventionally, the drives for the various moving components of the combine are disposed closely adjacent to the side of the main separator body, the drives generally being in the form of belt or chain-type drives. However, the grain is delivered to the grain tank by a clean grain elevator, which in many modern combines, is spaced outwardly from the side of the separator body and terminates at the side of the grain tank, the grain then being delivered to the grain tank interior by a lateral conveyor associated with the discharge end of the clean grain elevator. Advantageously, the lateral conveyor and the elevator are driven through a drive shaft at the upper end of the elevator, which is driven by a pulley mounted on the shaft at the exterior side of the elevator. Thus, the pulley on said drive shaft is spaced a substantial distance from the side of the main separator body, and since the drive system for many of the combine components is located adjacent to the side wall of the main separator body, the drive for connecting the elevator drive shaft to the other drive components must include means for laterally shifting the drive line. In the past, this has been accomplished by utilizing two separate belt drives, one of which is located adjacent to the side wall of the main separator body and the other of which is located adjacent the grain tank side wall and drives the elevator pulley, the two belt drives being conventionally connected by a pair of intermediate pulleys drivingly connected and transversely spaced on a transverse drive shaft, the separate pulleys being respectively aligned with the separate belt drives. This, of course, has required separate belt tensioning devices for the separate belt drives.

SUMMARY OF THE INVENTION

According to the present invention, an improved drive system is provided for such harvesting machine components wherein the output element of the drive is substantially offset from the input element. More specifically, a drive system is provided using two separate belts or endless flexible elements lying in parallel planes, and a single tensioning device is employed to provide the necessary tension in both the belts or endless flexible elements. One feature of such arrangement resides in the reduction of complexity and a consequent reduction in the cost of the drive system and the maintenance thereof.

Another more specific object of the invention is to provide such a drive system wherein a pair of intermediate pulleys are mounted on a swingable shaft, the intermediate pulleys respectively in the plane of the input and output pulleys and respectively being driven by and driving the separate belts or endless flexible elements, so that the tension applied to one of the endless flexible elements is automatically transmitted to the other element through the swingable shaft.

Still another object of the invention is to utilize such a drive system to drive the clean grain elevator on a combine wherein the input pulley to the drive is disposed adjacent to the combine side wall and the output pulley is laterally offset from the input pulley and disposed adjacent to the grain tank side wall.

BRIEF DESCRIPTION OF THE DRAWINGS

FIG. 1 is a right tide perspective view of a self-pelled combine embodying the present invention, with portions of the combine broken away to more clearly show the invention.

FIG. 3 is an enlarged section view taken generally along the lines 3—3 of FIG. 2.

FIG. 4 is an enlarged section view taken generally along the lines 4—4 of FIG. 2.

DESCRIPTION OF THE PREFERRED EMBODIMENT

Figure 2:
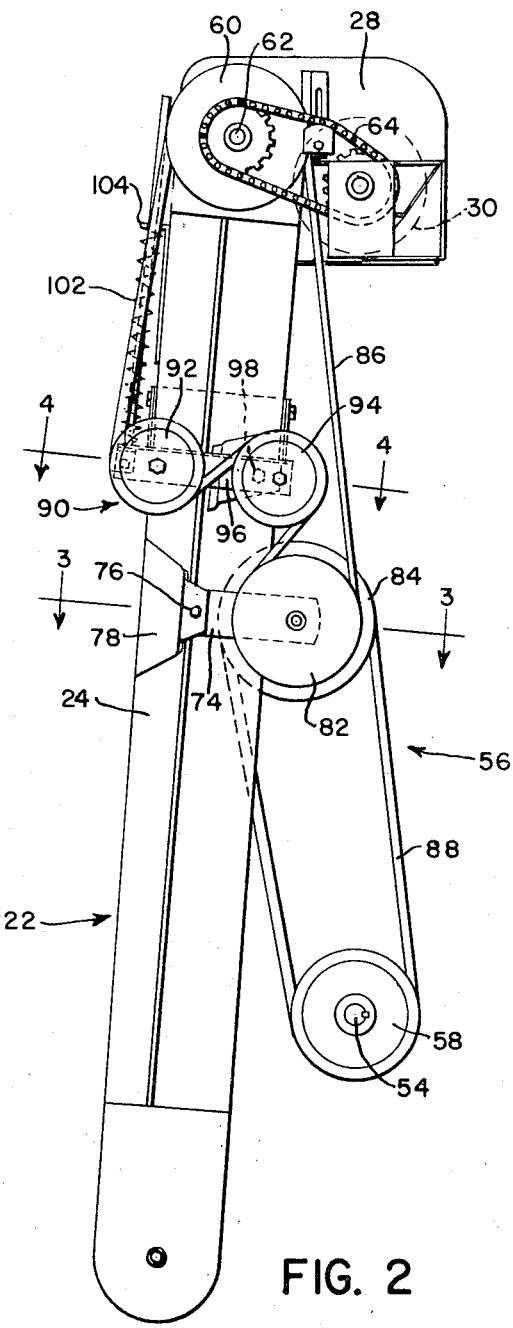
FIG. 2 is an enlarged side elevation view of the combine clean grain elevator and the drive system therefor.

The invention is embodied in a self-propelled combine having a main separator body, indicated generally by the numeral 10. The body 10 has opposite upright side walls 12 and is mounted on a pair of laterally spaced forward drive wheels 14 and steerable rear wheels 16. As the machine advances, the crop is removed from the field by a forward harvesting platform or header (not shown) and delivered rearwardly to the main separator body 10 through a forwardly extending feeder house 18, all of the above representing more or less conventional combine construction. As is also conventional, the grain is separated from the crop residue by a separating mechanism within the body 10 and cleaned by a mechanism also located within the body 10. The clean grain drops to the bottom of the combine and is collected by a transversely extending auger-type grain collection conveyor 20, which moves the clean grain laterally through the right side wall 12 and delivers it to the lower or intake end of a clean grain elevator 22.

As is apparent from FIG. 3, the elevator 22 is offset a substantial distance from the right side wall 12 and includes a generally vertical, elongated housing 24, within which a conventional elevator conveyor 26 is mounted. The conveyor 26 receives the grain from the auger 20, and elevates it to a chamber 28 at the upper end of the elevator 22, and an auger-type grain tank loading conveyor 30 moves the grain laterally from the chamber 28 to the interior of an elevated grain tank 32 mounted on the combine body 10.

The grain tank 32 has a horizontal open top 34 slightly above the upper level of the elevator 22 and opposite side walls 36 which are offset laterally outwardly from the combine side walls to a substantial degree, the grain tank 32 overhanging both sides of the main separator body. The grain tank also includes a front wall (not shown) and an upright rear wall 38. The right side wall of the grain tank has an inwardly offset portion 40, which forms a vertically extending recess 42 at the right side of the grain tank. The recess 42 is open toward the bottom, and the elevator 22 extends upwardly into said recess, the elevator being disposed slightly inwardly of the outer portion of the grain tank side wall. The recess 42 and the upper end of the elevator mounted therein are covered by a removable panel 44, only a portion of which is shown in FIG. 1, the panel 44 being flush with the outer portion of the grain tank side wall to present a smooth and attractive appearance, while covering the upper portion of the elevator and its associated components.

An internal combustion engine (not shown) is mounted immediately forwardly of the grain tank on the right side of the combine within an engine enclosure 46, the right side of the engine enclosure also being flush with the outer part of the grain tank right side wall 36. An elongated fore-and-aft panel 47 extends between the front of the engine enclosure and the rear of the grain tank below and flush with the outer part of the grain tank side wall and panel 44, the panel 47 also serving as a cover for a portion of the elevator 22.

The various driven components on the machine are driven by the engine by a drive system which includes a number of belt drives, indicated generally by the numeral 48 and mounted on the right side wall 12 immediately adjacent thereto. The drives 48 include a threshing cylinder drive, having a driven sheave 50, and also include a belt 51 driving a sheave 52 mounted on a transverse shaft 54, the shaft 54 severing as an input for a drive 56 for the clean grain elevator 22 and its associated grain tank loading conveyor 30.

The drive 56 includes an input sheave 58 mounted on and driven by the transverse shaft 54 and an output sheave 60 mounted on a transverse shaft 62 which drives the upper end of the elevator conveyor 26. The shaft 62 also drives the grain tank loading conveyor 30 through a chain drive 64.

Mounted on the right side wall 12 is a support bracket 66, which supports a transverse pivot shaft 68 extending outwardly from the side wall. A pair of parallel transversely spaced arms 70 are pivotally mounted on the pivot shaft 68 at one end and carry a transversely extending torque tube 72 at their other end, the arm 70 supporting the inner end of the torque tube 72. The outer end of the tube 72 is supported by an arm 74 parallel to the arm 70 and swingably mounted on a pivot 76 coaxial with the pivot shaft 68 and mounted on the elevator housing 24 by means of a brack 78. A transverse shaft 80 coaxially extends through and is journaled in the tube 72.

A sheave 82 is affixed to the outer end of the shaft 80, while another sheave 84 is affixed to the inner end of the shaft 80. The outer sheave 82 lies in the same vertical plane as the output sheave 60, while the inner sheave 84 lies in the same vertical plane as the input sheave 58. An outer V-belt 86 is drivingly trained around the outer sheave 82 and the output sheave 60, while an inner belt 88 is drivingly trained around the inner sheave 84 and the input sheave 58, the driving torque in the inner belt 88 being transmitted to the outer belt through the transverse shaft 80.

The upper or outer belt 86 is provided with a tensioning device, indicated in its entirety by the numeral 90. The tensioning device includes a pair of idler sheaves 92 and 94 respectively engageable with the opposite sides of the belt on the rearward belt run and mounted on the opposite ends of an arm 96, which is swingable about a transverse pivot 98 carried by a bracket 100 on the side of the elevator housing 24. The pivot 98 is located between the two idler sheaves 92 and 94 so that rotation of the arm about its pivot in a clockwise direction, as viewed in FIG. 2, moves the idler sheaves away from the belt, and rotation of the arm 96 in a counter-clockwise direction increases the deflection of the belt and consequently the tension therein. The arm 96 is biased for counterclockwise rotation by a helical-type compression spring 102, which operates between the rearward end of the arm 96 and a bracket 104 attached to the elevator housing.

In operation, the engine transmits power to the various driven components through various drive means, including the series of belt drives 48 along the right side of the combine. Since the input shaft 62 for the elevator conveyor has its outer end closely adjacent to the grain tank side panel 44, which is flush with the outer portion of the right grain tank side wall, the sheave 60, which drives the shaft 62, is substantially offset laterally from the elevator drive input sheave 58 along the side wall of the main separator body. To shift the drive train laterally outwardly, two separate belt drives are utilized, the first or inner belt 88 being located alongside the main separator body, while the second or outer belt 86 is located outwardly from the separator body in the vertical plane of the sheave 60, the power being transmitted between the separate drives by the transverse shaft 80. As is apparent, the tensioning device 90 supplies the necessary tension for the upper or outer belt 86 and the tension in the outer belt 86 causes the shaft 80 to swing about the axis of the pivot shaft 68 until the tension in the inner belt 88 balances the tension in the outer belt. Thus, only a single tensioning device is utilized, and this device is disposed within the recess 42, so that it is properly shielded by the panels 44 and 47. As is apparent from FIG. 1, the panel 47 also serves as a shield for the intermediate sheaves 82 and 84 and the swingable shaft 80 on which they are mounted. Thus, the entire outer belt drive is shielded by the panels 44 and 47, so that the elevator belt drive arrangement is both safe and economical.

I claim:

1. In an agricultural machine having a main separator body with opposite upright side walls, a drive system including a first transverse shaft and a driven sheave mounted on the shaft and disposed closely adjacent to the exterior of one of the side walls, a grain tank mounted on the body and having a side wall disposed outwardly of the main body side wall, and a grain tank loading conveyor alongside and spaced outwardly from the body and the drive means adjacent the body, the conveyor means having a transverse drive shaft with an outer end adjacent the grain tank side wall and disposed outwardly from the main body side wall, the combination therewith of an improved belt drive for drivingly connecting said drive system driven sheave to said drive shaft and comprising: an input sheave mounted on the first transverse shaft closely adjacent to and drivingly connected to said driven sheave; an output sheave coaxially and drivingly mounted on the outer end of said conveyor means drive shaft and laterally offset outwardly from the input sheave; an intermediate shaft disposed parallel to the conveyor means drive shaft and the first transverse shaft; first and second intermediate sheaves coaxially and drivingly mounted on the intermediate shaft and laterally spaced thereon, the first intermediate sheave lying in substantially the same vertical plane as the input sheave and the second intermediate sheave lying in substantially the same vertical plane as the output sheave; means mounting the intermediate shaft for shifting in a direction normal to the shaft axis; a first drive belt drivingly connecting the input sheave to the first intermediate sheave; a second drive belt drivingly connecting the second intermediate sheave to the output sheave; and belt tensioning means operatively associated with one of said drive belts to apply tension thereto and including a belt-engaging element and a spring means exerting a spring force urging the belt-engaging element against said one drive belt, the tension in said one drive belt being transmitted to the other drive belt through the shiftable intermediate shaft.

2. The invention defined in claim 1 wherein the intermediate shaft mounting means includes a pivot means mounted on the combine body axially parallel to and offset from the intermediate shaft and means connecting the intermediate shaft to the pivot means for swinging adjustment of the intermediate shaft about the axis of the pivot means.

3. The invention defined in claim 2 wherein the connecting means includes arm means mounted on the pivot means and a hollow tube carried by the arm means and coaxially journaling the intermediate shaft.

4. In an agricultural machine having an upright side wall, a drive means including a first transverse shaft and a driven pulley mounted on the shaft and disposed closely adjacent to the side wall, and a driven component having a drive shaft parallel to said first shaft with an outer end spaced away from said wall, the combination therewith of an improved drive for drivingly connecting the driven pulley to said drive shaft and comprising: an input pulley mounted on the first shaft closely adjacent and drivingly connected to the driven pulley; an output pulley coaxially and drivingly mounted on the outer end of said component drive shaft and lying in a vertical plane offset from the plane of the input pulley; an intermediate shaft disposed parallel to the component drive shaft and the first shaft; first and second intermediate pulleys coaxially and drivingly mounted on the intermediate shaft, the first intermediate pulley lying in substantially the same vertical plane as the input pulley and the second intermediate pulley lying in substantially the same vertical plane as the output pulley; means mounting the intermediate shaft for shifting in a direction normal to the shaft axis; a first endless flexible drive element drivingly connecting the input pulley to the first intermediate pulley; a second endless flexible drive element drivingly connecting the second intermediate pulley to the output pulley; and tensioning means operatively associated with one of said endless flexible elements to apply tension thereto and including a tensioning member engageable with the endless flexible element and a spring means exerting a spring force on said tensioning member urging the member against said one endless flexible drive element, the tension in said one element being transmitted to the other element through the shiftable intermediate shaft.

5. The invention defined in claim 4 wherein the endless flexible elements are drive belts and the pulleys are in the form of sheaves adapted to drivingly engage said belts.

6. The invention defined in claim 4 wherein the mounting means includes a pivot means mounted on the body axially parallel to and offset from the intermediate shaft, and means connecting the intermediate shaft to the pivot means for swinging adjustment of the intermediate shaft about the axis of the pivot means.

7. The invention defined in claim 6 wherein the connecting means includes arm means mounted on the pivot means and a hollow tube carried by the arm means and coaxially joining the intermediate shaft.

References Cited

UNITED STATES PATENTS

| 2,152,038 | 3/1939 | Gettys | 74—242.1 |
| 2,459,379 | 1/1949 | Hanson | 74—242.11 |
| 3,026,738 | 3/1962 | Rahlson | 74—242.15 |
| 3,228,203 | 1/1966 | Swenson | 74—228 XR |

JAMES A. WONG, Primary Examiner

U.S. Cl. X.R.

74—228, 242.11, 242.15